United States Patent
Mohebbi et al.

(10) Patent No.: US 12,377,587 B2
(45) Date of Patent: Aug. 5, 2025

(54) SHUT-OFF NOZZLE FOR INJECTION MOLDING

(71) Applicant: Moxietec, LLC, Grove City, PA (US)

(72) Inventors: Abolfazl Mohebbi, Mississauga (CA); Donald Jordan, Townville, PA (US); Nathan David Albensi, Meadville, PA (US); Robert Alan Sickles, Jr., Carlton, PA (US)

(73) Assignee: Moxietec, LLC, Grove City, PA (US)

( * ) Notice: Subject to any disclaimer, the term of this patent is extended or adjusted under 35 U.S.C. 154(b) by 0 days.

(21) Appl. No.: 19/041,305

(22) Filed: Jan. 30, 2025

(65) Prior Publication Data

US 2025/0178258 A1   Jun. 5, 2025

Related U.S. Application Data

(63) Continuation of application No. 18/640,747, filed on Apr. 19, 2024, now Pat. No. 12,275,175.
(Continued)

(51) Int. Cl.
*B29C 45/72*   (2006.01)
*B29C 45/23*   (2006.01)
*B29C 45/78*   (2006.01)

(52) U.S. Cl.
CPC ............ *B29C 45/231* (2013.01); *B29C 45/72* (2013.01); *B29C 45/78* (2013.01);
(Continued)

(58) Field of Classification Search
CPC . B29C 45/28; B29C 45/2803; B29C 45/2806; B29C 45/281; B29C 45/2817;
(Continued)

(56) References Cited

U.S. PATENT DOCUMENTS

| 4,498,860 A | 2/1985 | Gahan |
| 5,022,847 A | 6/1991 | Hehl |

(Continued)

FOREIGN PATENT DOCUMENTS

| CA | 2061731 A1 | 9/1992 |
| CN | 210211225 U | 3/2020 |

(Continued)

OTHER PUBLICATIONS

International Search Report and Written Opinion issued in International Application No. PCT/US2024/025460, mailing date Jul. 5, 2024.

*Primary Examiner* — Thu-Khanh T. Nguyen
(74) *Attorney, Agent, or Firm* — Benesch Friedlander Coplan & Aronoff LLP

(57) ABSTRACT

Disclosed herein are novel methods for forming a polymer part including providing an injection molding system with a shut-off nozzle, where the shut-off nozzle includes a main body, a nozzle tip body, a flow path through the main body and the nozzle tip body, a nozzle tip, and a shut-off mechanism. The nozzle tip includes an internal passage and a cooling mechanism. The shut-off mechanism includes a passageway intersecting the flow path at an angle and a pin positioned in the passageway. The method further includes the steps of initiating an injection molding cycle by injecting molten polymer through the shut-off nozzle into a cavity of a mold, actuating the shut-off mechanism to move the pin in the passageway into the intersection of the passageway and flow path, and initiating the cooling mechanism to solidify molten polymer in the nozzle tip to form a solid slug.

21 Claims, 20 Drawing Sheets

Related U.S. Application Data

(60) Provisional application No. 63/594,652, filed on Oct. 31, 2023.

(52) U.S. Cl.
CPC .................. *B29C 2945/7604* (2013.01); *B29C 2945/7621* (2013.01); *B29C 2945/76531* (2013.01); *B29C 2945/76688* (2013.01)

(58) Field of Classification Search
CPC .................... B29C 45/72; B29C 45/73; B29C 45/7306–7312; B29C 45/76; B29C 45/78; B29C 45/82
See application file for complete search history.

(56) References Cited

U.S. PATENT DOCUMENTS

| | | |
|---|---|---|
| 5,375,993 A | 12/1994 | Hehl |
| 5,511,968 A | 4/1996 | Guzzini et al. |
| 2004/0032060 A1 | 2/2004 | Yu |
| 2009/0074906 A1 | 3/2009 | Braun |
| 2014/0217645 A1 | 8/2014 | Schmitt |
| 2019/0366361 A1 | 12/2019 | Binek et al. |

FOREIGN PATENT DOCUMENTS

| | | |
|---|---|---|
| DE | 102006058122 B3 | 12/2007 |
| GB | 900673 A | 7/1962 |

SHUT-OFF NOZZLE FOR INJECTION MOLDING

CROSS-REFERENCE TO RELATED APPLICATIONS

The present application is a continuation of U.S. patent application Ser. No. 18/640,747, titled "Shut-Off Nozzle for Injection Molding," filed Apr. 19, 2024, and claims priority to U.S. Provisional Application Ser. No. 63/594,652, titled "Shut-Off Nozzle for Injection Molding," filed Oct. 31, 2023, both of which are fully hereby incorporated by reference herein.

FIELD OF INVENTION

The present disclosure generally relates to methods of using a shut-off nozzle with injection molding processes. More specifically, the present disclosure relates to an efficient shut-off nozzle for injection molding of polymer foams to form components and parts with precise dimensions and unmarred surfaces.

BACKGROUND

Injection molding systems and processes are useful in manufacturing plastic products and components. A typical injection molding system includes an injection molding machine and a mold. The injection molding machine includes a barrel, a reciprocating screw located at least in part in the barrel, heating elements to heat the barrel, and a nozzle extending from the end of the barrel. The mold includes a cavity shaped to form the desired product or component. The injection molding process begins by providing a source of solid polymer, such as polymer pellets, to the reciprocating screw, which introduces the polymer into the barrel. Through a combination of shear stresses applied by the reciprocating screw and heat applied by the heating element to the barrel, the polymer pellets melt to form a molten polymer that can flow through the barrel. The nozzle is placed proximate to an opening in the mold and the molten polymer flows into the cavity of the mold until the cavity is filled, and the flow of molten polymer ceases. Once the cavity is filled, the mold is cooled until the polymer solidifies to form the desired product or component. The product or component is removed from the mold, and the process is repeated. While the basic injection molding process appears fairly straightforward, the varying nature of different polymers and controlling the viscosity and flow of such varying polymers requires precise methods and environmental parameters to create a repeatable injection molding process.

For example, if a specific polymer forms a high viscous molten polymer when heated and sheared, the molten polymer can be injected into the mold using a simple open-channel nozzle without any specific resistance. Because of its high viscosity, when the flow of the polymer ceases, the polymer does not tend to continue to flow out of the nozzle. However, if a polymer has a low viscosity in its molten state, at the conclusion of the injection process, when the system intends the flow of the polymer to cease, molten polymer may continue to flow and leak from the tip of the nozzle (commonly referred to as "drool" or "drooling"). Such drooling results in unfavorable flashing and requires frequent cleaning by an operator, which slows down the injection molding process and causes inefficiencies. These issues are particularly problematic when molding products or components from polymer foams.

Using polymer foam in the injection molding process adds complexity to the process. A foam injection process as compared to standard solid injection process is more sensitive to environmental parameters and poses challenges regarding flow control through prior art shut-off nozzles. Such prior art shut-off nozzles have disadvantages and are not readily suitable for the foam injection process. In particular, prior art nozzles pose significant challenges once the molten polymer is saturated with gases (i.e., foamed). As an initial matter, when a molten polymer is saturated with gases introduced by a blowing agent, the melt flow index (MFI) of the polymer is very high, causing significant drooling issues in the injection molding process. Additionally, such a gas saturated molten polymer must be carefully managed to create more efficient nucleation and a higher pressure drop rate, which results in a higher expansion of the polymer entering the mold and a more uniform cellular structure for the final product or component.

Prior art shut-off nozzles used with foaming polymers result in excessive drooling and inconsistent final products and components. FIG. 1 illustrates such a prior art shut-off nozzle 10. The shut-off nozzle 10 includes a shut-off mechanism 20, which is typically positioned perpendicular to the direction of molten polymer flow through the system. In the example of FIG. 1, a shut-off mechanism 20 includes a pin (also referred to as a needle) 30 that is selectively actuated to stop the flow of polymer through a flow path 40 of the shut-off nozzle 10. The pin 30 is positioned in a passageway 50 that intersects a flow path 40 at a right angle. As illustrated in the enhanced image FIG. 1A, the flow path 40 near where it intersects the passageway 50 is not consistent in diameter. As polymer flows through the flow path 40, the diameter of the flow path 40 is first stepped down twice as the polymer nears the passageway 50, thus twice decreasing the diameter of the flow path 40. The diameter is then stepped up twice as the polymer moves away from the passageway 50, thus twice increasing the diameter of the flow path 40. These changes in the diameter of the flow path 40 are designed to reduce the diameter at the point where the pin 30 intersects the flow path 40 to make it easier for the pin 30 to stop the flow of molten polymers through the flow path 40. However, the reductions in diameter of the flow path 40 leading to the intersection with the passageway 50 and the expansion in diameter after the intersection with the passageway 50 are highly detrimental to the quality and amount of foaming experienced by the molten polymer. These changes in diameter can cause early and inefficient cell nucleation and formation in the molten polymer, which ultimately results in less weight reduction and inconsistent cell morphology in the molded component.

Referring again to FIG. 1, when the pin 30 is in a retracted position, the polymer is free to follow through the flow path 40 of the shut-off nozzle 10, out of a nozzle tip 60, and into the awaiting cavity of the mold. When the pin 30 is actuated, the pin 30 moves upward (relative to FIG. 1) so that it is positioned in the flow path 40 to stop the flow of polymer through the flow path 40. In such a prior art machine 10, the distance ($D_1$) between the location where the pin 30 of the shut-off mechanism 20 engages the flow path 40 to stop the flow of polymer and the end of the nozzle tip 60 is significant. This results in a significant volume of molten polymer positioned between the pin 30 and the end of the nozzle tip 60. When the injection cycle ends, the mold is cooled to solidify the molded component. However, the large volume of polymer left in the shut-off nozzle 10 typically only partially solidifies between cycles. This makes it difficult to eject this remaining polymer and results in unwanted flashing and excessive drooling, which unnecessarily affects the next molded component and often interrupts the injection molding process due to the need to clean the shut-off nozzle 10.

This disclosure describes novel shut-off nozzles for use with foam injection molding of polymers that address the issues with prior art shut-off nozzles and result in significantly more control of the injection molding process and result in superior final molded products and components.

SUMMARY

Disclosed herein are novel methods for using a shut-off nozzle with an injection molding system for creating and injecting foaming polymers to form products and other components. The methods of using a shut-off nozzle are designed to increase cell nucleation during the foaming process, increase the pressure drop rate as the polymer is injected into a mold, and prevent drooling of the foamed polymer at the end of an injection cycle. The shut-off nozzle used with the methods described herein includes a novel shut-off mechanism with an angled shut-off pin, which significantly reduces the amount of waste in each injection cycle, and a novel nozzle tip with a fluid-cooling circuit to rapidly cool and solidify the molten polymer remaining in the shut-off nozzle at the end of each injection cycle.

In one embodiment, a method for forming a polymer part includes the step of providing an injection molding system with a shut-off nozzle, where the shut-off nozzle includes a main body, a nozzle tip body extending from the main body, a flow path through the main body and the nozzle tip body, a nozzle tip positioned partially in the nozzle tip body, and a shut-off mechanism. The nozzle tip includes an internal passage and a cooling mechanism. The shut-off mechanism includes a passageway intersecting the flow path at an angle to the flow path and a pin positioned in the passageway. The method further includes the steps of initiating an injection molding cycle by injecting molten polymer through the shut-off nozzle into a mold until a cavity of the mold is filled with molten polymer, actuating the shut-off mechanism to move the pin in the passageway into the intersection of the passageway and flow path, and initiating the cooling mechanism to solidify molten polymer in the nozzle tip to form a solid slug.

Optionally, the method described above can further include the step of cooling the molten polymer in the cavity of the mold to solidify the molten polymer in the cavity of the mold to form a polymer part. The step of initiating the cooling mechanism to solidify molten polymer in the nozzle tip to form a solid slug and the step of cooling the molten polymer in the cavity of the mold to solidify the molten polymer in the cavity of the mold to form a polymer part may occur at the same time. After the step of initiating the cooling mechanism to solidify molten polymer in the nozzle tip to form a solid slug and the step of cooling the molten polymer in the cavity of the mold to solidify the molten polymer in the cavity of the mold to form a polymer part are completed, the cold slug and formed polymer part may be physically connected, where the formed polymer part from the mold and the solid slug from the nozzle tip can be ejected together from injection molding system.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

FIG. 1A is an enhanced view of the flow path of the prior art shut-off nozzle of FIG. 1 illustrating the flow path near the passageway of the shut-off nozzle.

DETAILED DESCRIPTION

Figure 1:
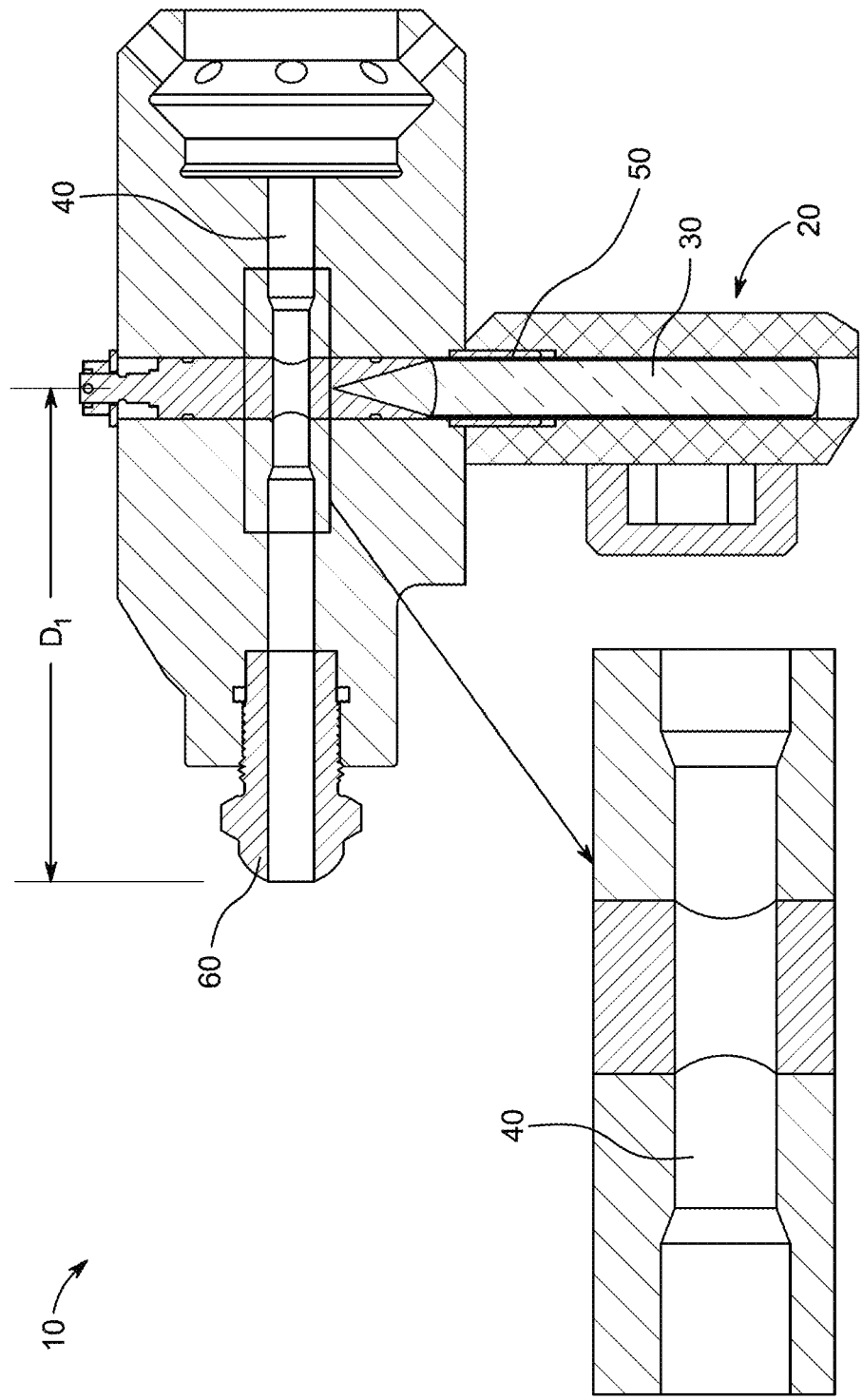
FIG. 1 schematically illustrates a cross-sectional view of a prior art shut-off nozzle.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of shut-off nozzles for use in injection molding processes forming products and components from foamed polymers are hereinafter disclosed and described in detail with reference made to FIGS. 1 through 20.

Disclosed herein is a novel shut-off nozzle for use with an injection molding system that is effective in processing and foaming polymers and forming final products and components. The novel arrangement of a shut-off mechanism and cooling system of the shut-off nozzle increases cell nucleation during the foaming process, increases the pressure drop as the polymer is injected into a mold to promote cell growth and stabilization, limits drooling at the end of each injection cycle, and solidifies polymer left in a nozzle tip between cycles to facilitate ejection of the solidified polymer prior to the subsequent cycle.

Polymer foams, and more particularly, thermoplastic foams, are formed by saturating polymers with gases while in a molten state. One mechanism for such saturation is to blend the polymer with a blowing agent wherein gases are created from chemical reactions of a chemical blowing agent. Another mechanism is to inject gas directly into the flow of molten polymer followed by a rapid thermodynamic instability. Such processes result in the creation of a large number of instantaneous nuclei. A portion of such nuclei progress to cell growth due to pressure drop, surface tension of saturated molten polymer, and/or normal or shear stress applied to the molten polymer. Such cell growth results in voids in the final molded product, which advantageously reduces the density and thus the weight of the final molded product. The above-mentioned parameters affect the value of critical radius ($r^*$) for the desired cells. If the injection molding process results in an increase of cells with a radius that is greater than the critical radius, more cells will progress to an enhanced growth stage and result in successful foaming and weight reduction in the final molded product. Conversely, if more cells have radius less than the critical radius, the cells will dissipate, reducing the probability of successful foaming and weight reduction of the final molded product. An important parameter of a foaming process to manage through shut-off nozzle design is the level of additional stresses (normal and shear) applied to the flow of molten polymer as it progresses through the injection molding machine. Therefore, the design of the flow path within the shut-off nozzle can result in a more successful foaming process.

The novel shut-off nozzles disclosed herein produce higher foaming and expansion of the molten polymer, more consistent injection of the molten foamed polymer into the mold cavity, and superior surface finishes for molded components. Additionally, the novel shut-off nozzles avoid the common issue of a semi-solid plastic sprue part (i.e., a "cold slug") left in the nozzle tip between cycles such that the cold slug from one molding cycle is injected into the mold cavity during the subsequent molding cycle, which negatively affects the subsequent molded part.

Figure 2:
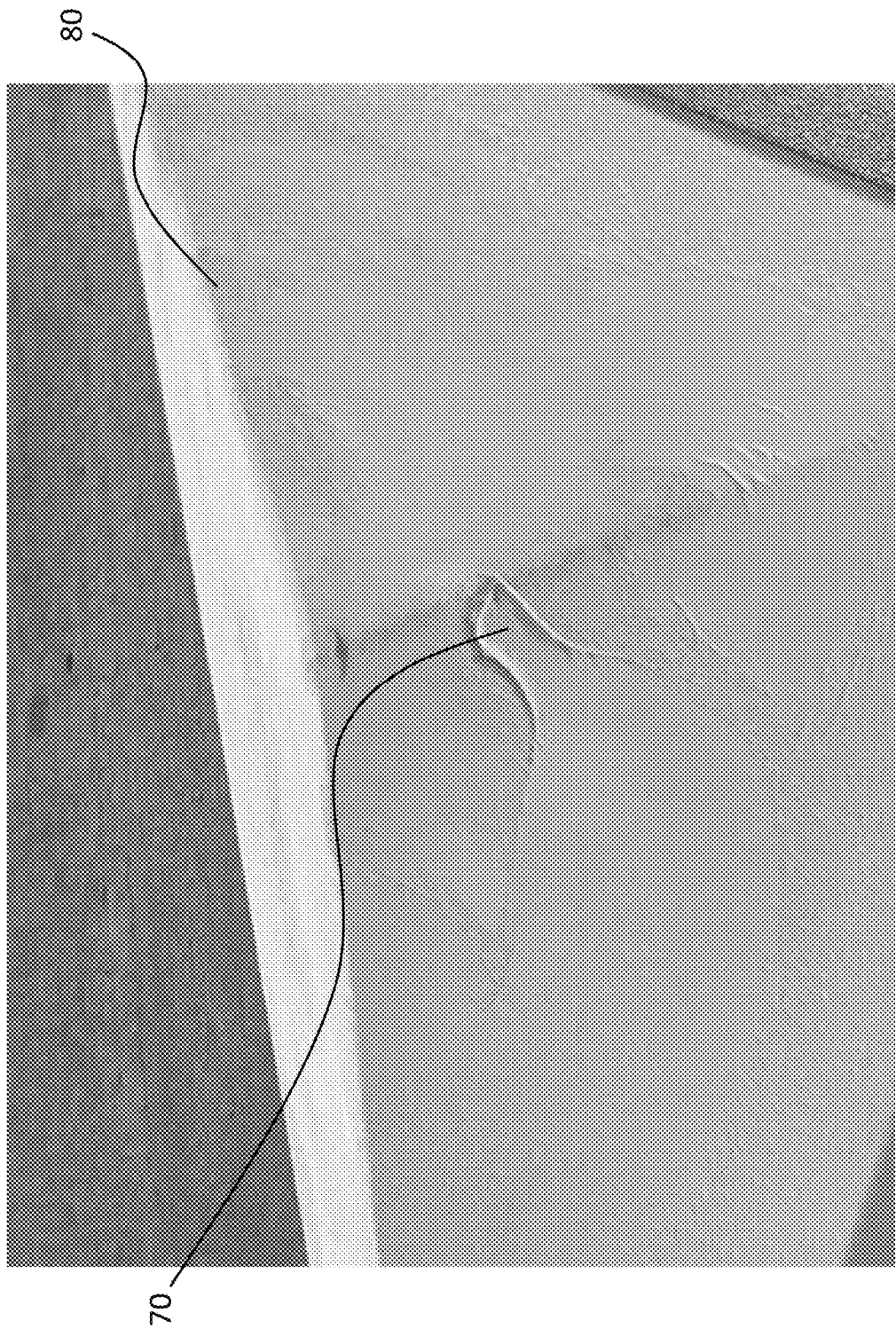
FIG. 2 is a photograph of a molded article formed by an injection molding machine with a prior art shut-off nozzle.
Figure 3:
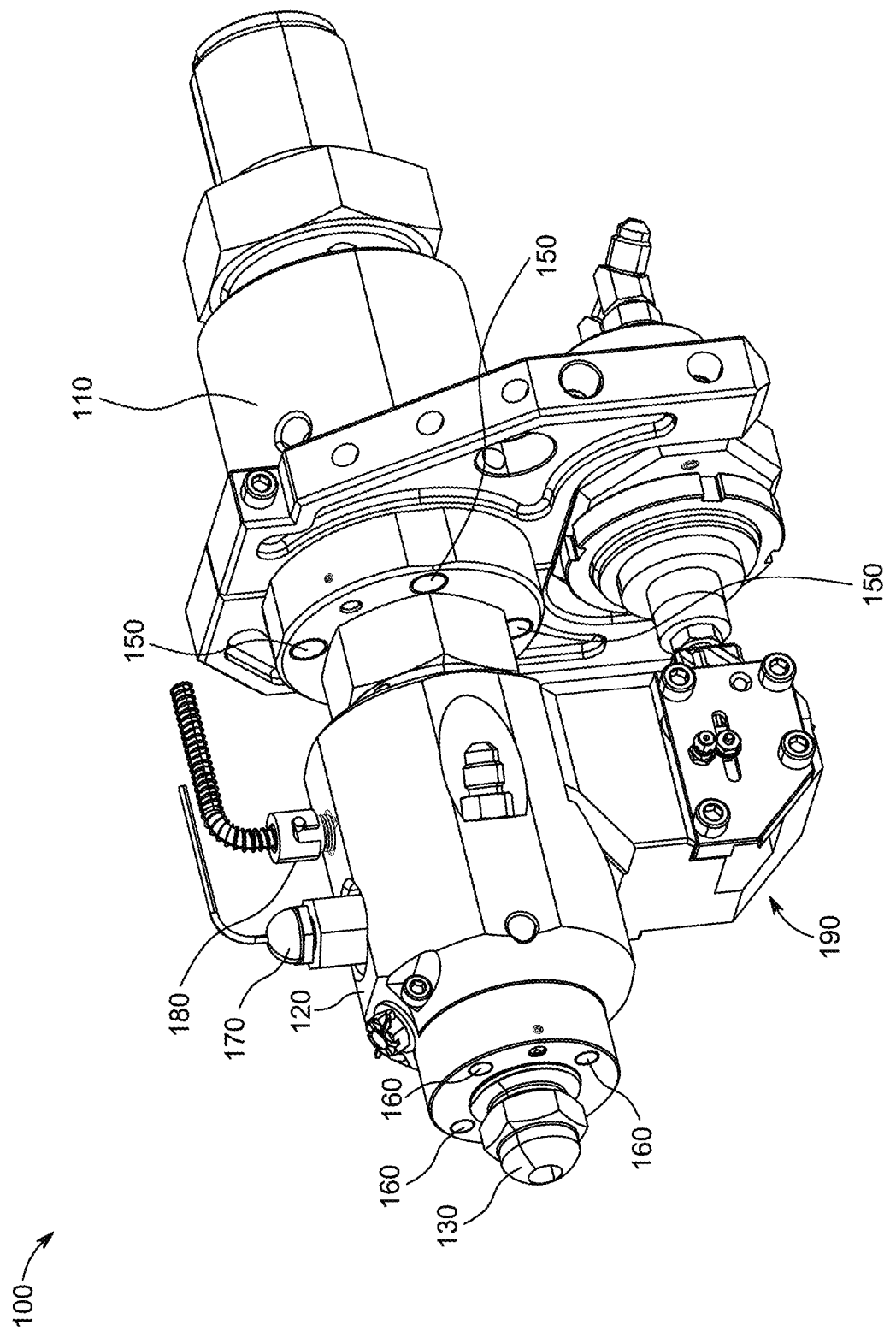
FIG. 3 schematically illustrates a perspective view of an exemplary embodiment of a shut-off nozzle for use with an injection molding machine.

The shut-off nozzle and processes disclosed herein are well-suited for parts and components that benefit from precise dimensions, consistent physical and mechanical properties, and unmarred surfaces. Certain industries, such as medical devices, particularly for devices that are used in or implanted into the human body; automotive; aerospace, and other similar industries prefer or require high dimensional precision and unblemished surfaces. In addition, such industries highly value consistency and structural integrity in components. As discussed herein, injection molding machines using prior art shut-off nozzles often result in inconsistent foaming properties for polymers processed through the injection molding machine and inferior molded parts that often include significant surface imperfections and structural integrity issues. One example of a surface imperfection common in foamed polymer components molded using a prior art shut-off nozzle (such as the shut-off nozzle 100 illustrated in FIG. 1) is depicted in the photograph of FIG. 2. As will be appreciated, when the distance between the location where the pin 30 shuts off the flow of molten polymer and the nozzle tip 60 (represented as $D_1$ in FIG. 1) is significant and that molten polymer in the nozzle tip is not adequately cooled and solidified, the ejection of the leftover material is not effective or efficient. This results in a portion of the cold slug remains in the nozzle tip between injection cycles. The cold slug often remains in a form of an elongated stringy remnant. During the next injection cycle, the cold slug is injected into the cavity of the mold in its semi-solid state. The cold slug typically moves to the far end of the cavity, and as illustrated in FIG. 2, this cold slug often causes a significant irregularity or imperfection 70 in the surface of the molded article 80. In other examples, the cold slug can be located within the body of the molded article where it can affect the structural integrity of the molded article. It will be readily understood that such outcomes result in inferior foam molded parts and components that may be unsuitable for industries that desire or require precision parts and components.

Figure 4:
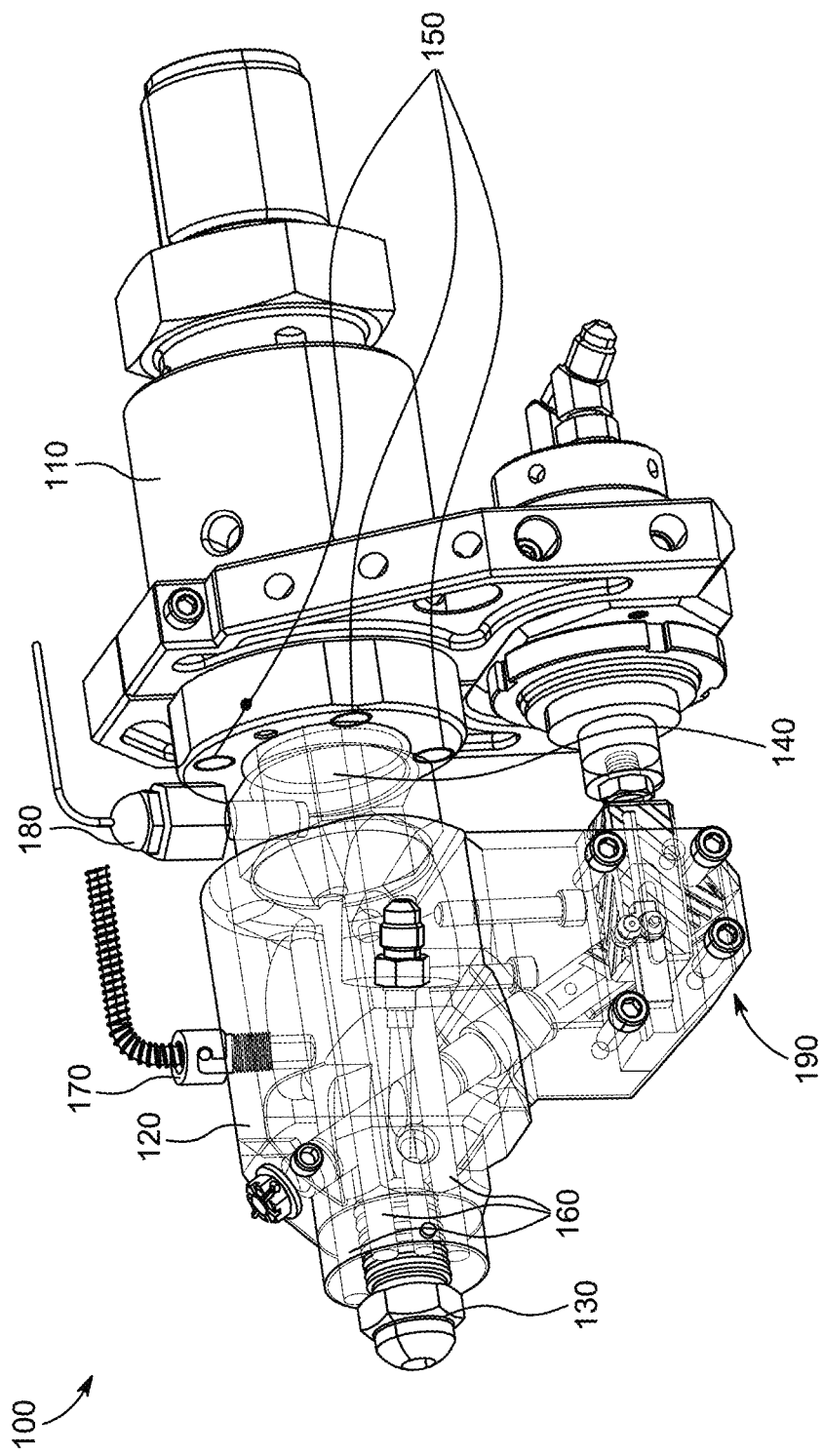
FIG. 4 schematically illustrates a perspective view of the shut-off nozzle of FIG. 3 with transparent sections revealing internal mechanisms.

With reference to FIGS. 3-19, an exemplary embodiment of a shut-off nozzle 100 for use with an injection molding machine (not shown) is illustrated. It will be appreciated that such a shut-off nozzle 100 is arranged to attach to the end of an injection molding machine and designed to channel molten polymers from the injection molding machine to the cavity of a mold. In one embodiment, the shut-off nozzle 100 is arranged to attach to the injection molding machine via threaded screw arrangement. The shut-off nozzle 100 includes a main body 110, a nozzle tip body 120, and a nozzle tip 130. A flow path 140 passes through the main body 110, the nozzle tip body 120, and the nozzle tip 130 to provide a path for molten polymer, typically a thermoplastic polymer, to flow from the injection molding machine to the mold. The polymer is fed through the flow path 140 by a force provided by a reciprocating screw of the injection molding system. The shut-off nozzle 100 includes a number of heating elements, often referred to as heater cartridges, located near the flow path 140. For example, as illustrated in FIG. 4, four heating elements 150 are equally spaced around the flow path 140 in the main body 110 and apply heat to the main body 110 to maintain a constant temperature for polymer following through that section of flow path 140. Additionally, four heating elements 160 are equally spaced around the flow path 140 throughout the nozzle tip body 120 and apply heat to the nozzle tip body 120 and nozzle tip 130 to maintain a constant temperature for polymer following through that section of flow path 140. The heating elements 150, 160 are arranged to maintain the molten state of the polymer at constant temperature all along the flow path of 140 as the polymer passes through the shut-off nozzle 100.

The shut-off nozzle 100 includes a pair of temperature sensors 170, 180 positioned in the nozzle tip body 120. The first temperature sensor 170 is located at approximately the mid-point of the nozzle tip body 120 and extends downward into the flow path 140 so that the temperature sensor 170 directly measures the temperature of the polymer flowing through the flow path 140. The second temperature sensor 180 is located near the intersection of the main body 110 and the nozzle tip body 120 and provides an approximate measurement of the temperature of the polymer as it exits the main body 110 and enters the nozzle tip body 120. A control unit can receive and analyze the temperature measurements of the pair of temperature sensors 170, 180 and make any required adjustments to the heating elements 150, 160 positioned in the main body 110 and/or the nozzle tip body 120.

When the molten polymer reaches the end of the shut-off nozzle 100, it is periodically injected into a cavity of a mold through the nozzle tip 130. When the polymer processed through the shut-off nozzle 100 has a low viscous or high melt flow index, such as a polymer foam, the injection molding process benefits from a shut-off mechanism incorporated into the flow path. Such a shut-off mechanism, in its retracted state, allows the molten polymer to flow through the nozzle tip 130 and into the mold during each injection cycle but, in its actuated state, blocks the flow of the molten polymer in-between injection cycles.

Figure 5:
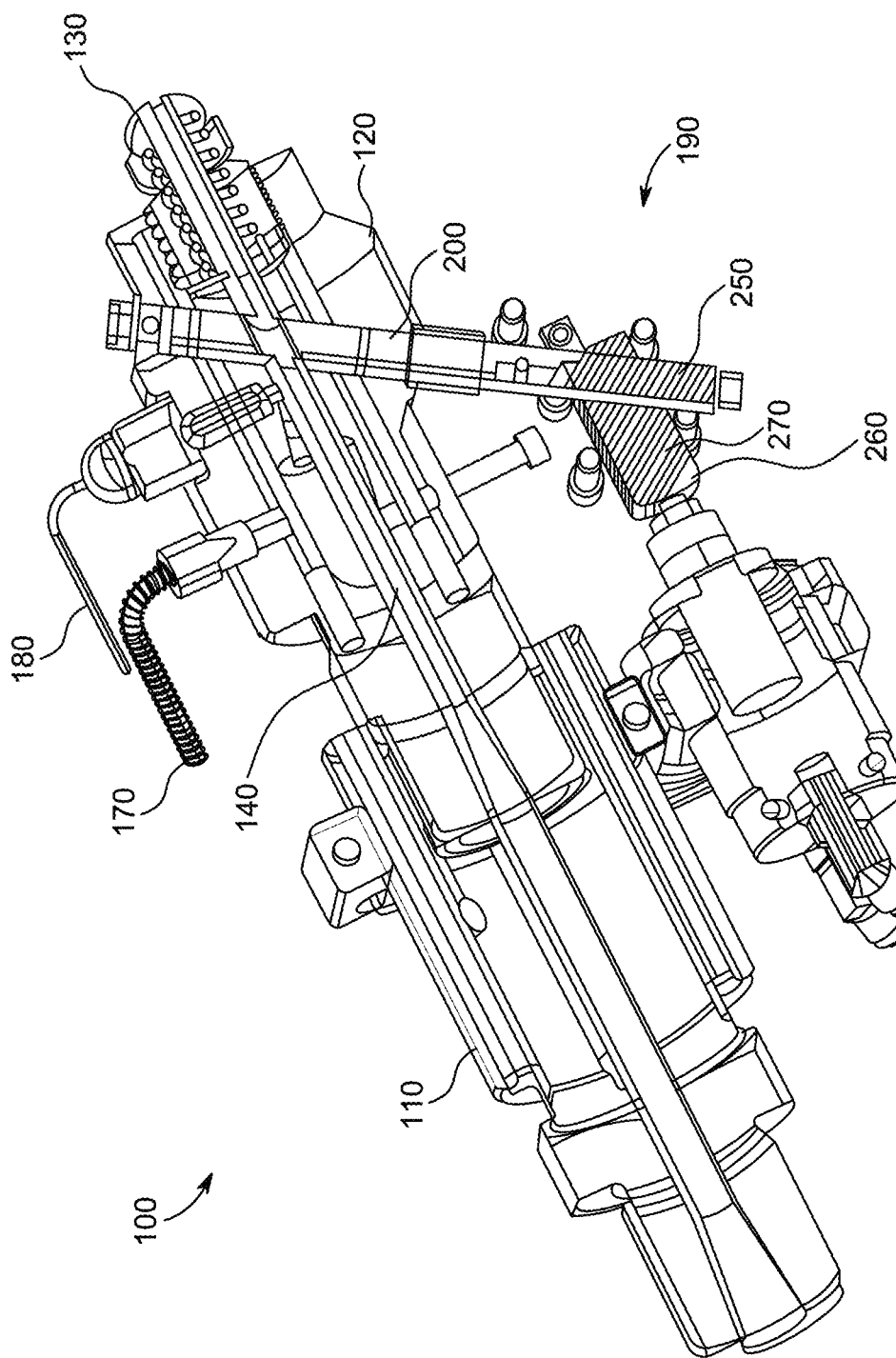
FIG. 5 schematically illustrates a cross-sectional side view of the shut-off nozzle of FIG. 3.
Figure 6:
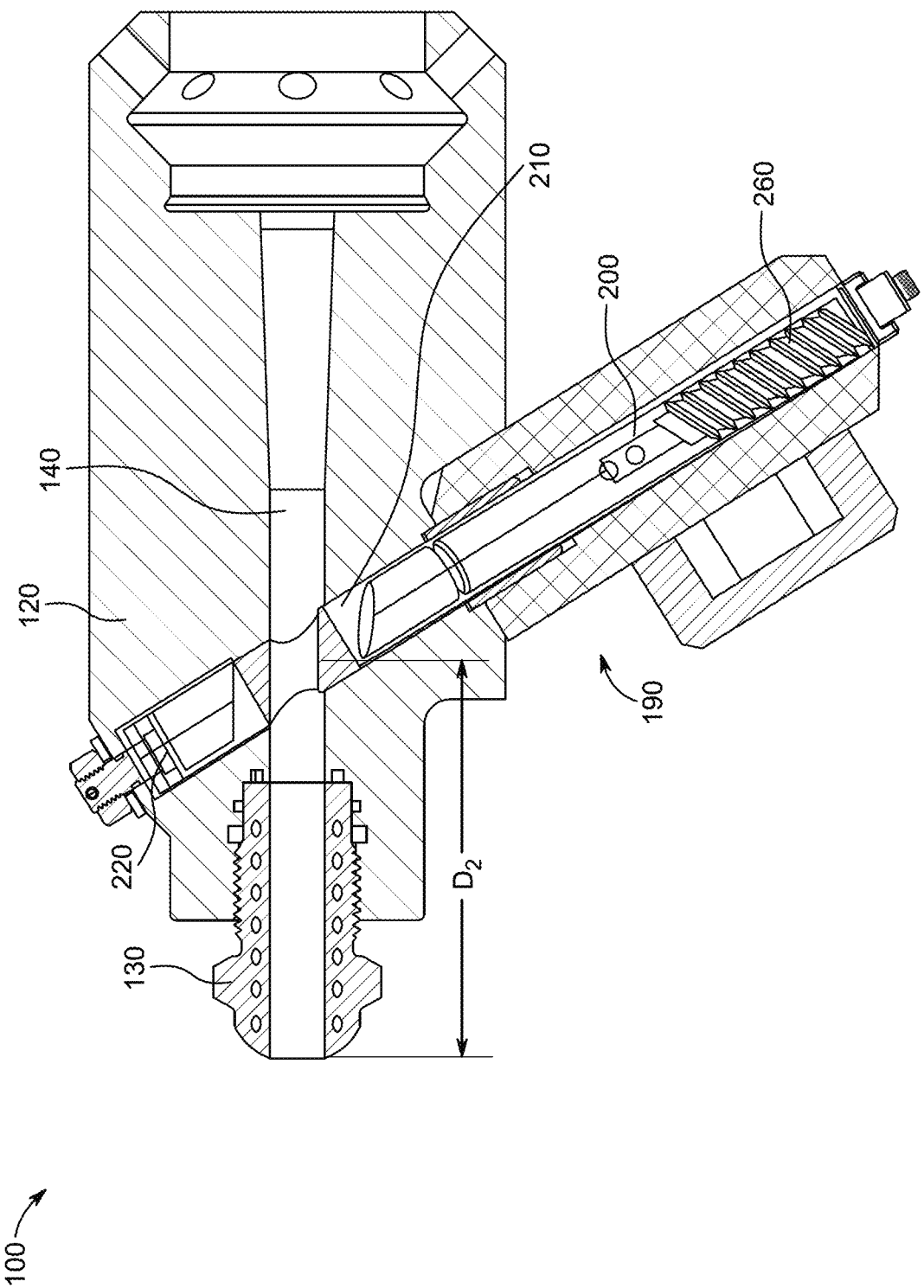
FIG. 6 schematically illustrates another cross-sectional view of the shut-off nozzle of FIG. 3.

FIGS. 5 and 6 schematically illustrate cross-sectional views of a novel shut-off mechanism 190 for use in a shut-off nozzle 100. The shut-off mechanism 190 includes a pin 200 located in a passageway 210, where the pin 200 and passageway 210 are positioned at an angle to the flow path 140 such that when the pin 210 is actuated, it intersects the molten polymer flow in the flow path 140 at a location much closer to the end of the nozzle tip 130 than in prior art shut-off nozzles (represented by $D_2$ in FIG. 6). As illustrated, the passageway 210 extends past the flow path 140. A stationary stop 220 is located in the portion of the passageway 210 that extends past the flow path 140. The stationary stop 220 includes a surface located proximate to the flow path 140 that is arranged to engage with the leading surface of the pin 210 when the pin 210 is actuated. The engaging surfaces of the pin 210 and stationary stop 220 are arranged to facilitate a clean cut of the molten polymer flow through the flow path 140 and prevents any polymer from flowing upward into the passageway 210. The overall arrangement of the shut-off mechanism 190 significantly reduces the volume of molten polymer positioned between the shut-off location and the end of the nozzle tip 130 at the completion of each injection cycle. The flow path 140 prior to and after the location where the passageway 210 intersects the flow path 140 has a constant diameter. This constant diameter prevents early and inefficient cell nucleation as the polymer flows through the flow path 140 and onto the mold cavity.

Figures 7, 8, 9:
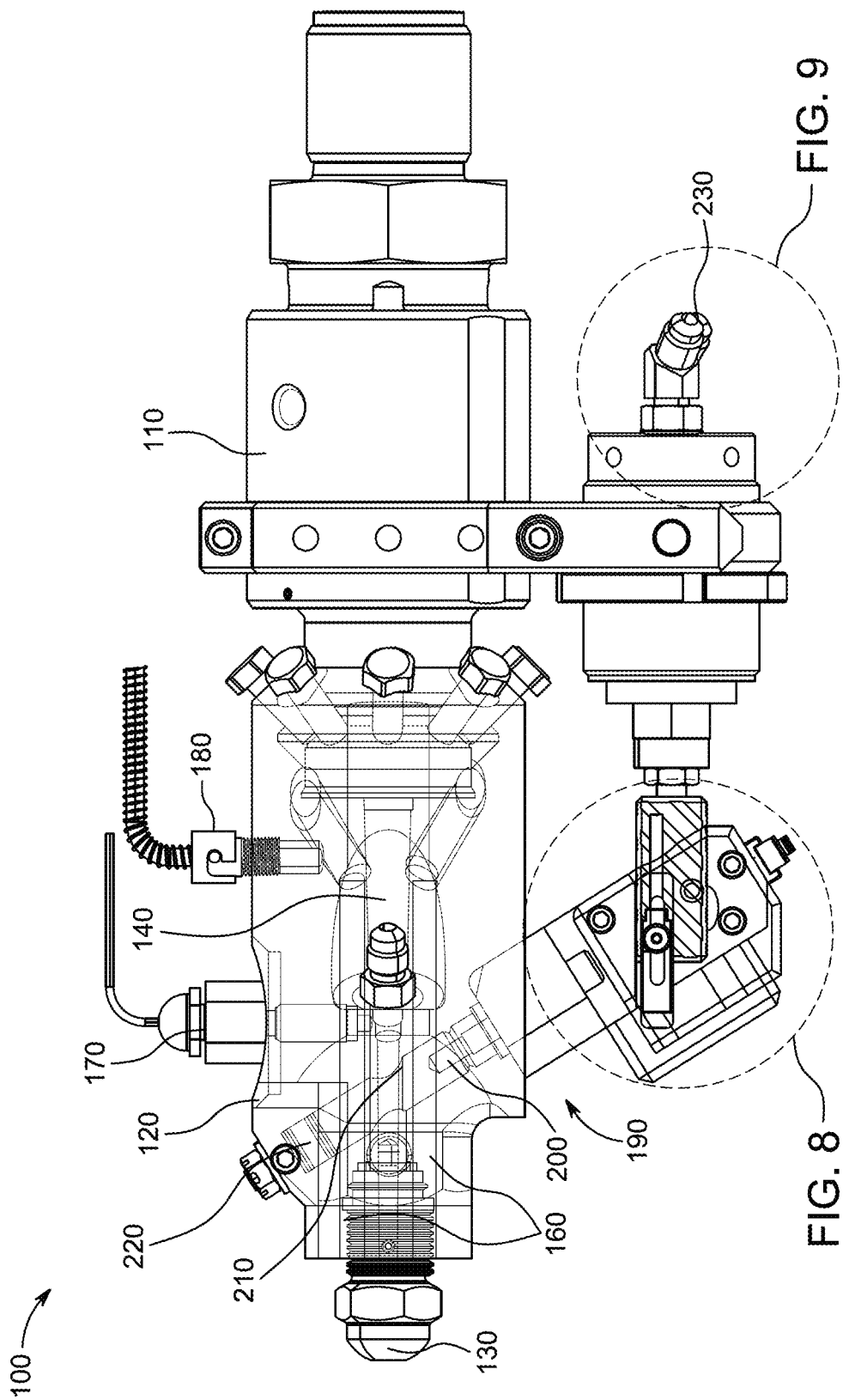
FIG. 7 schematically illustrates a side view of the shut-off nozzle of FIG. 3 with a transparent section revealing a shut-off mechanism.
FIG. 8 schematically illustrates the identified section of FIG. 7.
FIG. 9 schematically illustrates the identified section of FIG. 7.
Figure 8:
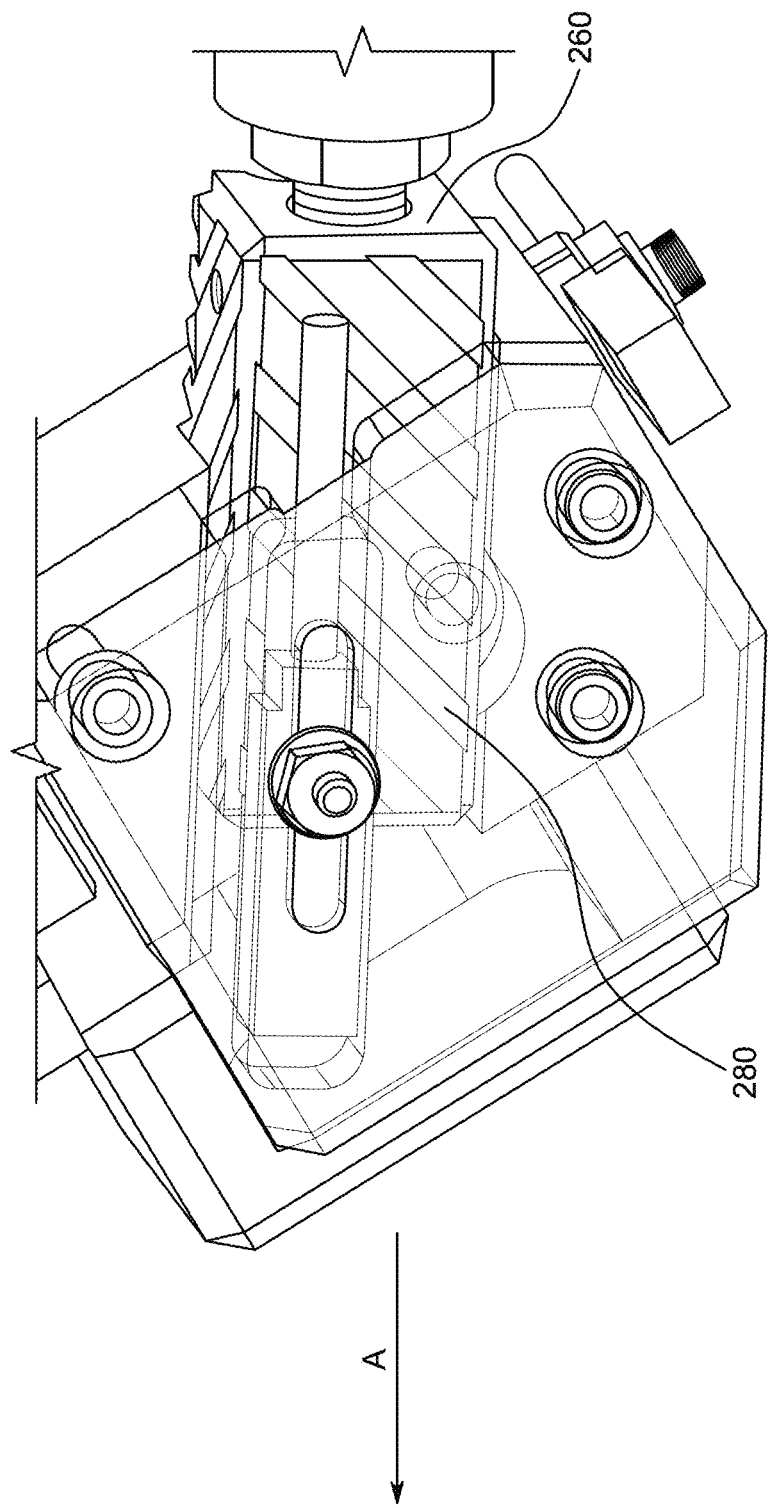
Figure 9:
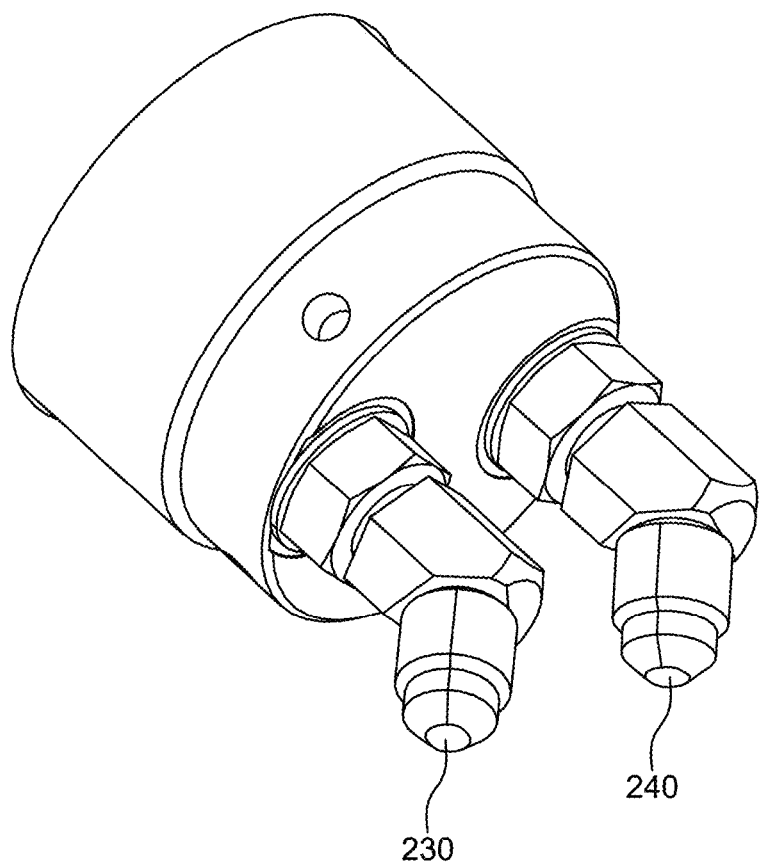

FIG. 7 schematically illustrates the shut-off nozzle 100 with a transparent nozzle tip body 120 showing the internal shut-off mechanism 190, and FIG. 8 schematically illustrates an enhanced view of the shut-off mechanism 190. The shut-off mechanism 190 can be actuated and retracted by a control unit using, for example, pneumatic or hydraulic power attached to an inlet 230 and an outlet 240 (illustrated in FIG. 9). The control unit can actuate the pin 200 to effectuate shut off of the molten polymer flow at the end of each injection cycle and engage the stationary stop 220 and can subsequently retract the pin 200 at the beginning of each injection cycle to allow molten polymer to flow through the flow path 140, out of the nozzle tip 130, and into the mold.

It will be understood that the pin 200 can be actuated and driven through the passageway 210 to intersect with the flow path 140 by the allocation of pneumatic or hydraulic power.

Figure 10:
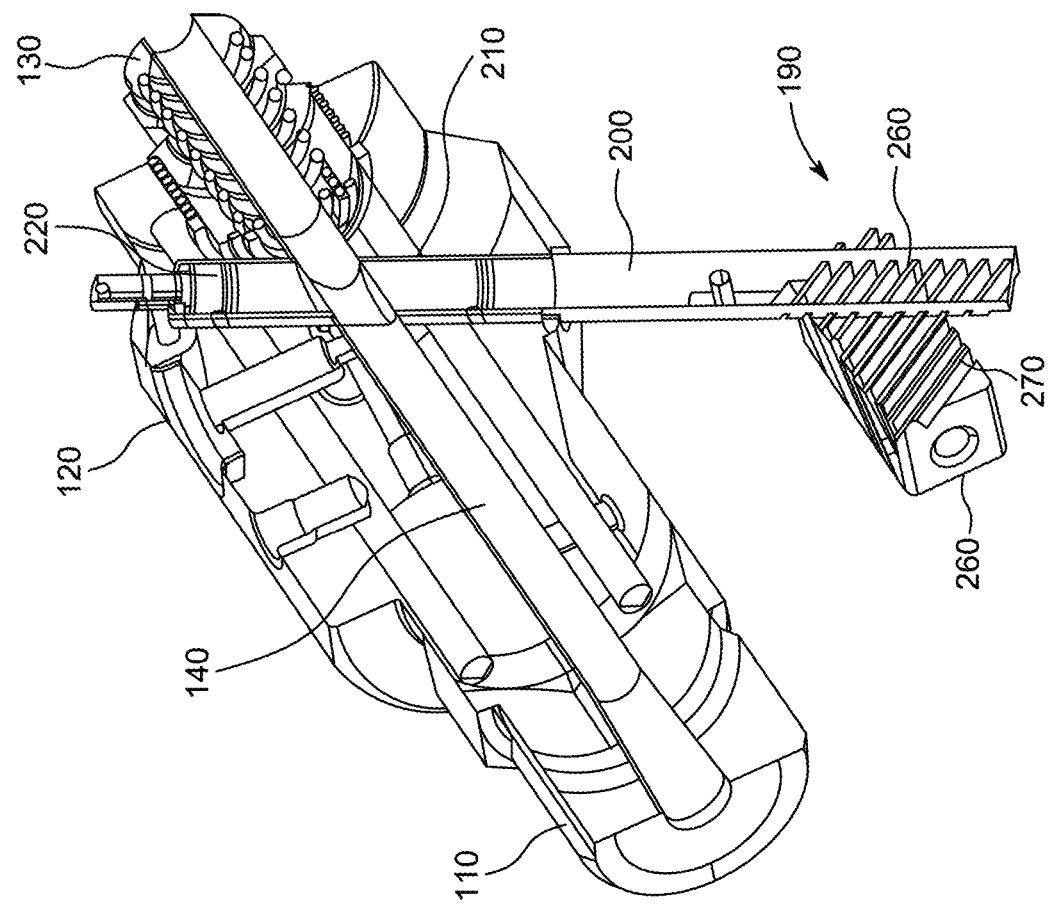
FIG. 10 schematically illustrates a cross-section view of the engagement of the pin and drive plate of the shut-off nozzle of FIG. 3.
Figure 11:
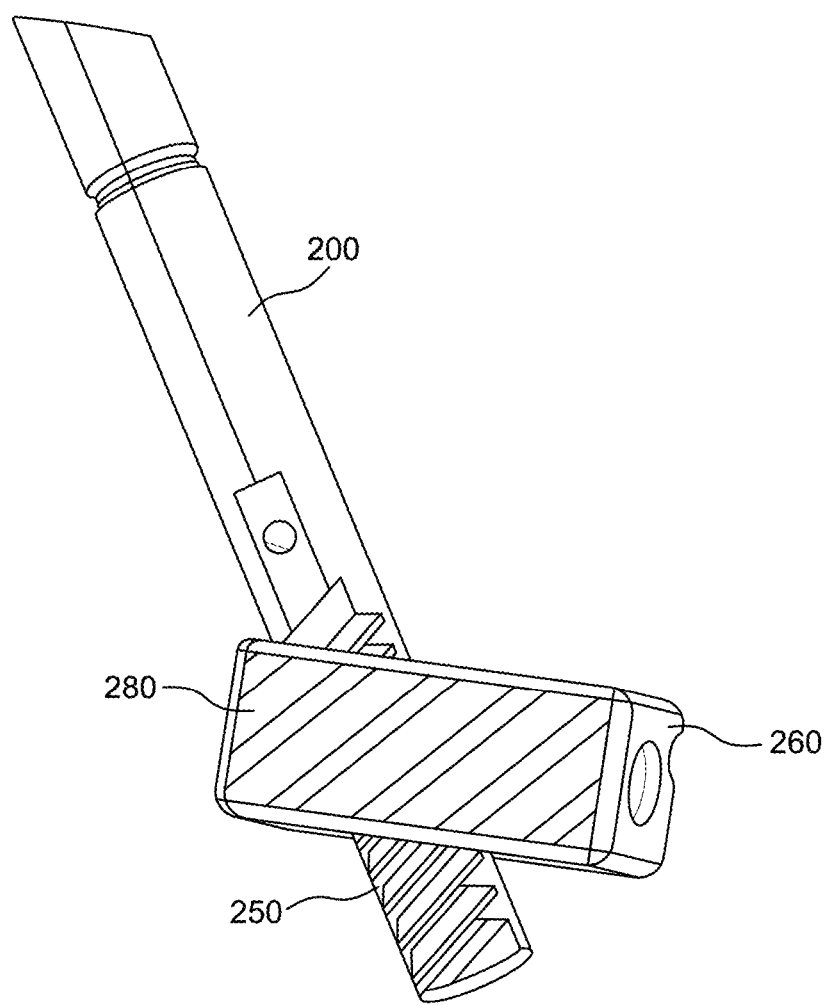
FIG. 11 schematically illustrates another view of the engagement of the pin and drive plate of the shut-off nozzle of FIG. 3.
Figure 12:
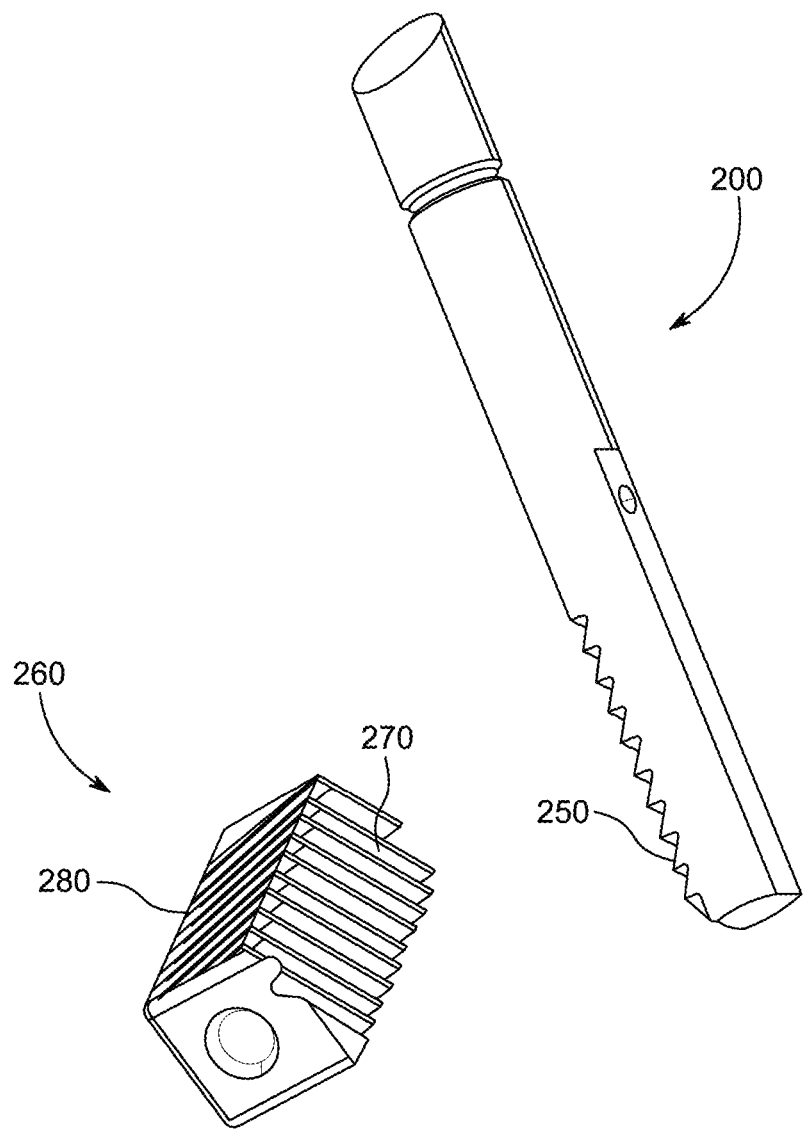
FIG. 12 schematically illustrates an exploded view of the pin and drive plate of the shut-off nozzle of FIG. 3.
Figure 13:
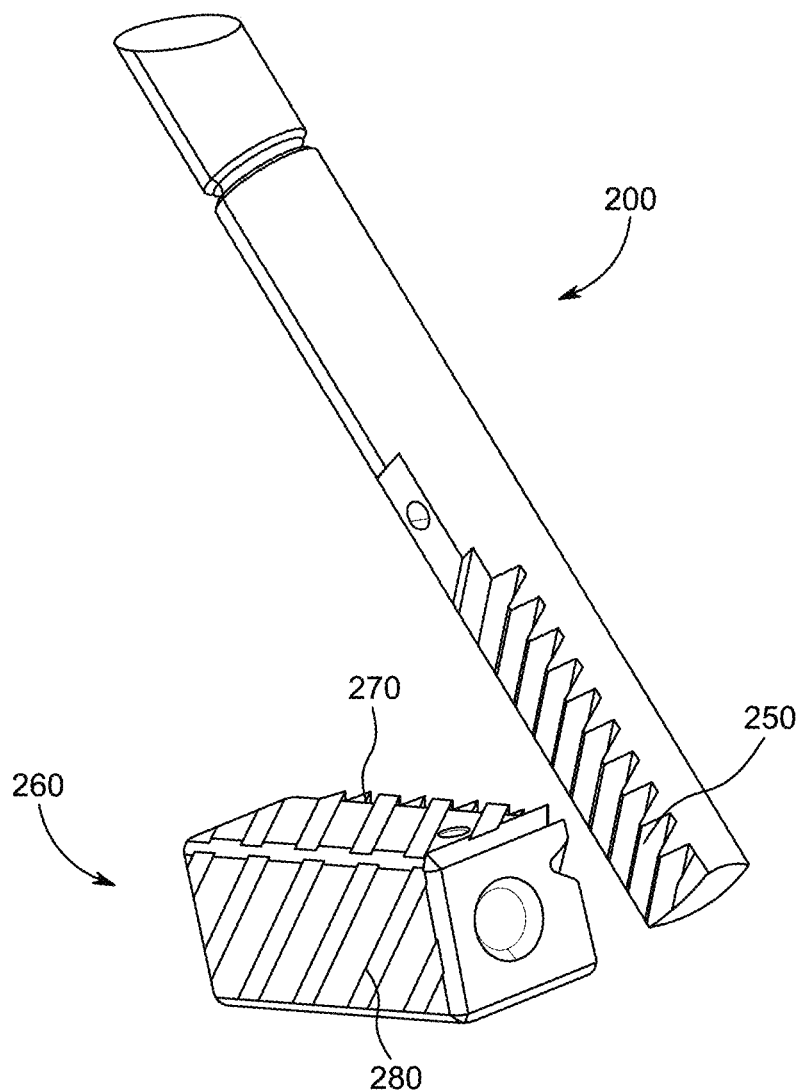
FIG. 13 schematically illustrates another exploded view of the pin and drive plate of the shut-off nozzle of FIG. 3.

One mechanical mechanism for actuating and retracting the pin 200 through the passageway 210 includes a series of linear gear teeth 250 located at a lower portion of the pin 200 and a drive plate 260 that includes a series of linear gear teeth 270 that engage the linear gear teeth 250 of the pin 200. FIGS. 10 and 11 illustrates the linear gear teeth 250 of the pin 200 engaged with the linear gear teeth 270 of the drive plate 260. FIGS. 12 and 13 illustrate exploded views of the pin 200 and drive plate 260. The drive plate 260 includes a number of grooves 280 on its outside surfaces to accommodate a lubricant such as oil or grease to facilitate smooth movement of the drive plate 260 during actuation and retraction.

Figure 14:
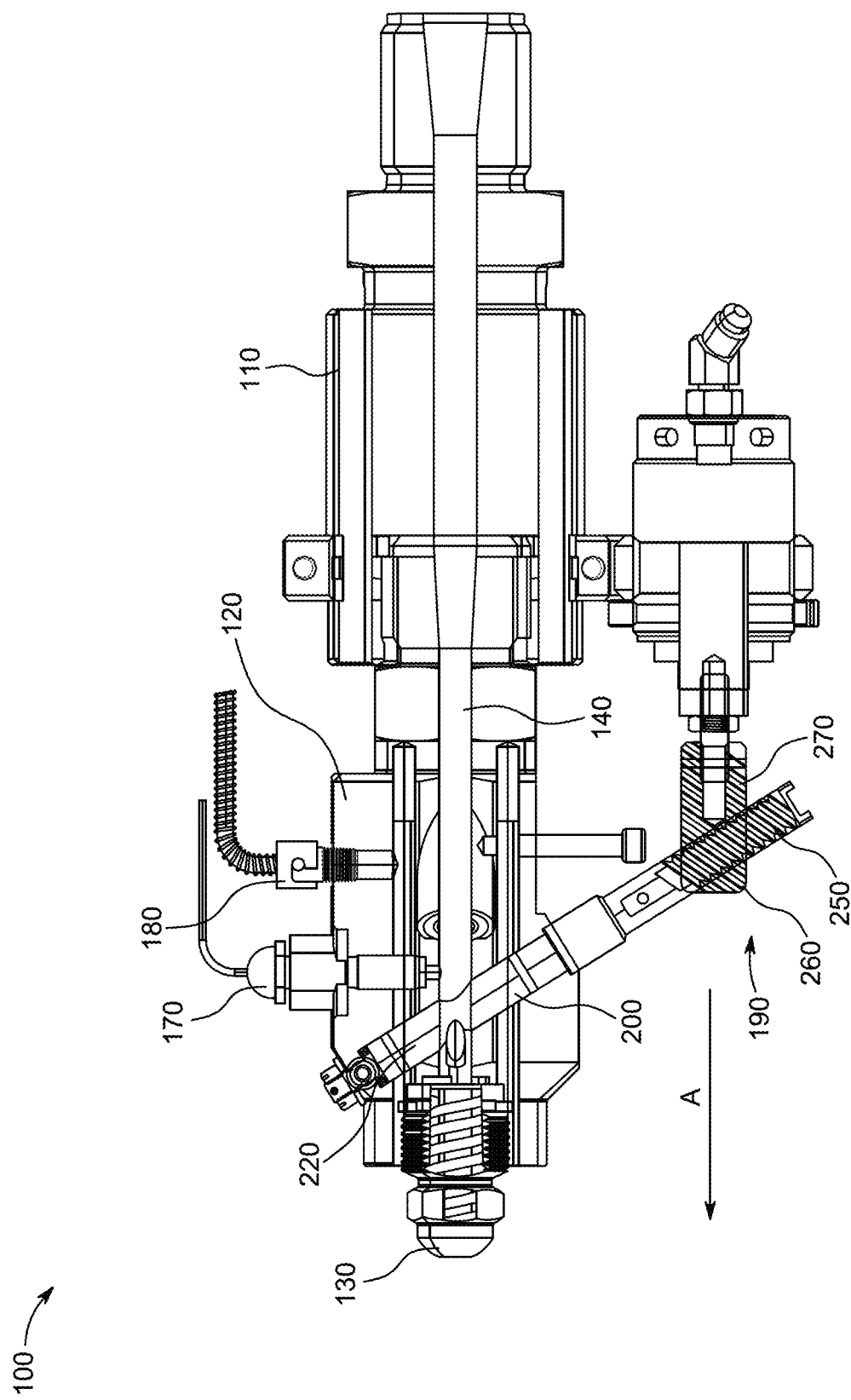
FIG. 14 schematically illustrates a cross-sectional view of the shut-off mechanism in a retracted position.
Figure 15:
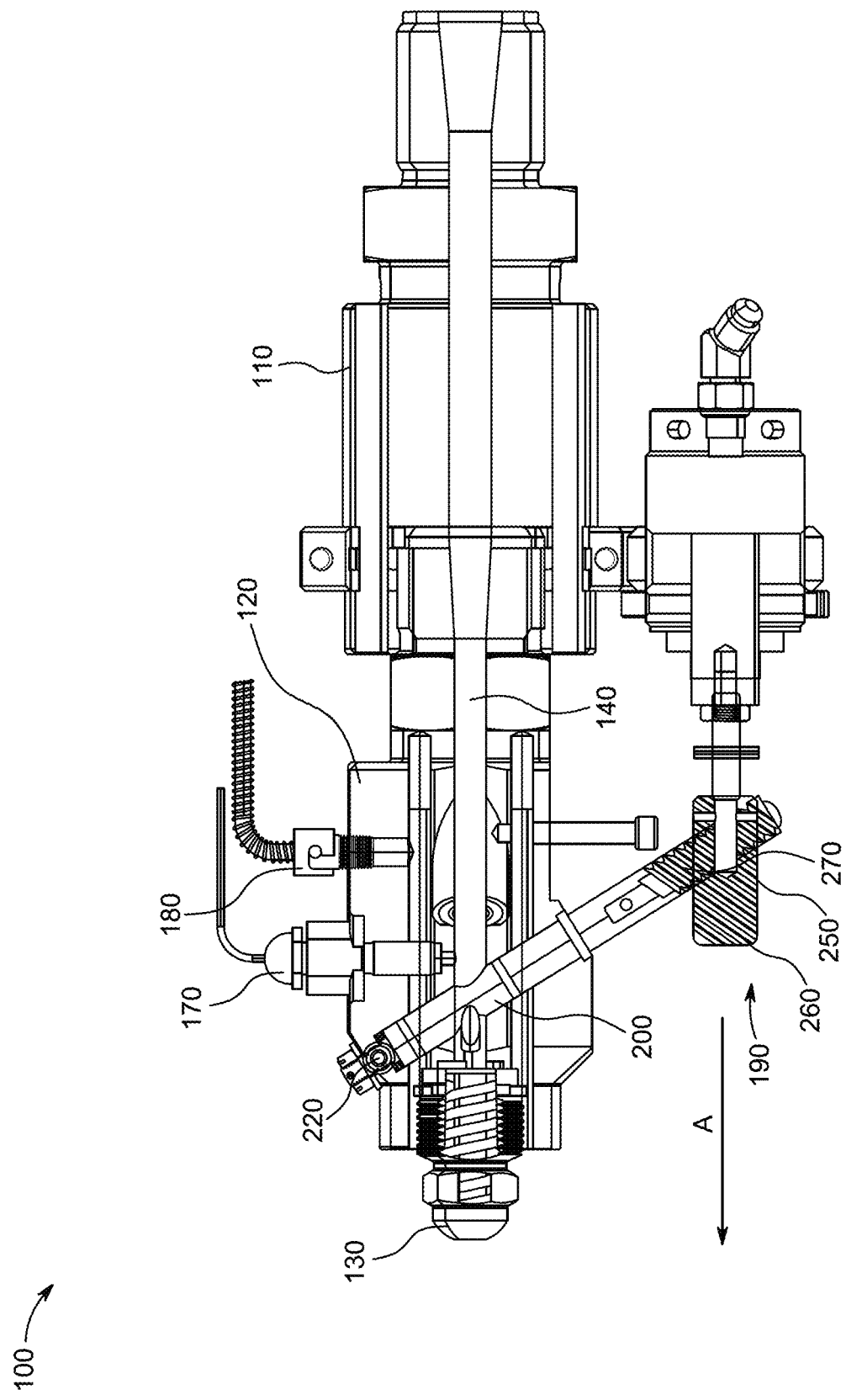
FIG. 15 schematically illustrates a cross-sectional view of the shut-off mechanism in an actuated position.

The position of the drive plate 260 and pin 200 in the retracted position is illustrated in FIG. 14, and the position of the drive plate 260 and pin 200 in the actuated position is illustrated in FIG. 15. When a pneumatic or hydraulic force is applied to the drive plate 260, the drive plate 260 is moved to the left (relative to FIGS. 8, 14, and 15 and in the direction of arrow A). As will be appreciated, the linear gear teeth 270 of the drive plate 260 are at an angle to the direction of movement of the drive plate 260. Thus, when the drive plate 260 moves in the direction of the arrow A, the engagement of the drive plate 260 linear gear teeth 270 and the pin 200 linear gear teeth 250 drives the pin 200 upward toward and through the flow path 140. When the pneumatic or hydraulic force is removed. The drive plate 260 is retracted to the right (relative to FIGS. 8, 14, and 15 and in the opposite direction of arrow A). When the drive plate 260 moves in the opposite direction of the arrow A, the engagement of the drive plate 260 linear gear teeth 270 and the pin 200 linear gear teeth 250 retract the pin 200, which moves downward away from the flow path 140 and returns the pin 200 to its unactuated position (as illustrated in FIGS. 6 and 14). The movement of the drive plate 260 is facilitated by application of hydraulic or pneumatic forces via the inlet 230 and outlet 240. To actuate the pin 200 by moving the drive plate 260 in the direction of arrow A, a hydraulic or pneumatic fluid is injected through the inlet 230 applying a positive force on the drive plate 260. To retract the pin 200 by moving the drive plate 260 in the opposite direction of arrow A, the hydraulic or pneumatic fluid is evacuated through the outlet port 240 which applies a back pressure or negative force to the drive plate 260.

In another embodiment, the actuation of the pin 200 can be directly driven by the application of a pneumatic or hydraulic force and the pin 200 is retracted by a biasing member, such as a spring (not illustrated). This is to say that when the pneumatic or hydraulic power is removed, the spring will retract the pin 200 and return it to its retracted position (as illustrated in FIG. 6). The spring can be arranged such that it elongates when the pin 200 is actuated and moved upward to intersect the flow path 140. Thus, when the pneumatic or hydraulic power is removed, the spring returns to its natural position and retracts the pin 200.

In addition to the novel angled shut-off mechanism 190, the shut-off nozzle includes a novel nozzle tip 130 as illustrated in FIGS. 16 through 19. The nozzle tip 130 is positioned partially within the nozzle tip body 120 such that an internal passage 300 within the nozzle tip 130 aligns with the flow passage 140. The nozzle tip 130 includes a novel cooling mechanism 310 formed within the nozzle tip 130. This cooling mechanism rapidly cools and solidifies the molten polymer located between the actuated pin 200 of the shut-off mechanism 190 and the end of the nozzle tip 130 that remains in the flow path 140 and internal passage 300 of the nozzle tip 130 at the end of each injection cycle. Such a rapid cooling and solidification process forms a solid slug of polymer that can be effectively ejected together with the part(s) between injection cycles. The cooling process is arranged such that the process is rapid enough to significantly reduce or eliminate drooling and improves the injection molding process.

As noted above, four heating elements 160, such as cartridge heaters, are positioned within the nozzle tip body 120 to precisely maintain the temperature of the polymer flowing through the flow path 140 and internal passage 300 of the nozzle tip 130 during each injection cycle. At the end of each injection cycle, the pin 200 of the shut-off mechanism 190 is actuated to cut off the flow of polymer through the flow path 140. The heating elements 160 are turned off and a cooling system is initiated to rapidly solidify the remaining polymer in the flow passage 140 and in the internal passage 300 of the nozzle tip 130.

Figure 16:
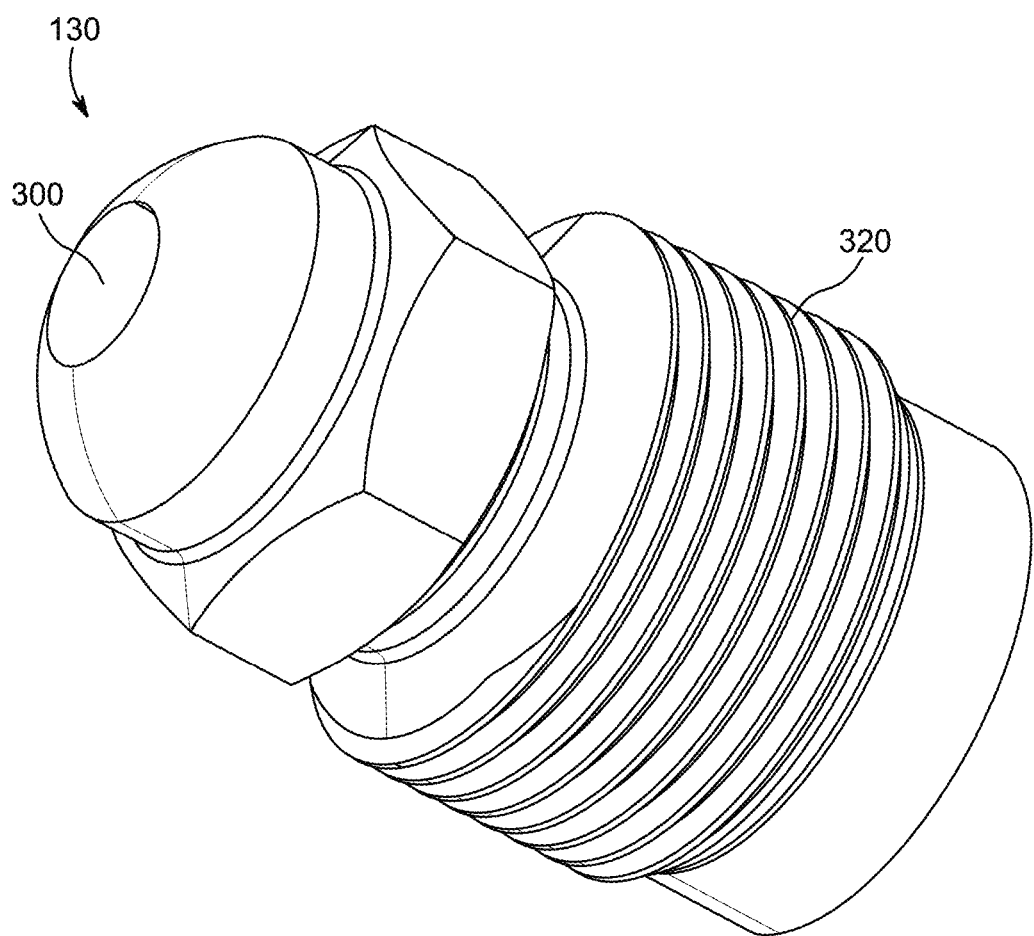
FIG. 16 schematically illustrates a perspective view of a nozzle tip with a helical cooling system.
Figure 17:
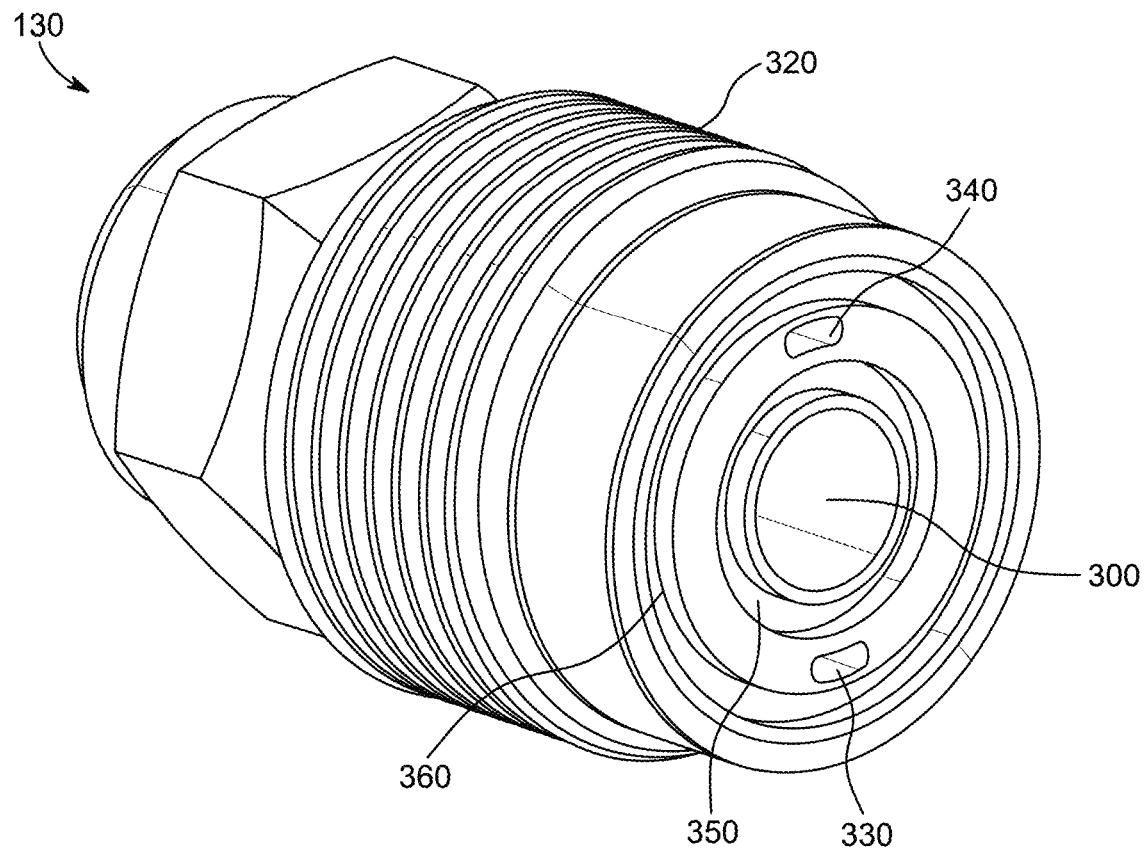
FIG. 17 schematically illustrates another perspective view of a nozzle tip with a helical cooling system.
Figure 18:
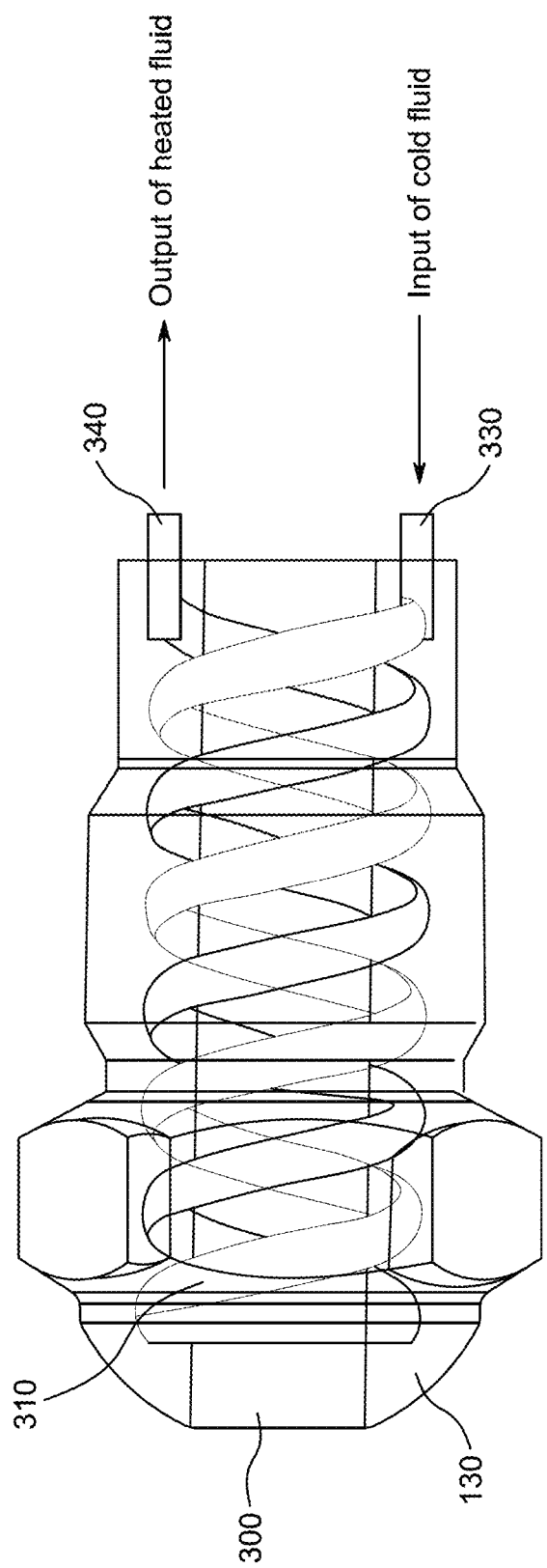
FIG. 18 schematically illustrates the nozzle tip of FIG. 16 with a transparent section showing the helical cooling system.
Figure 19:
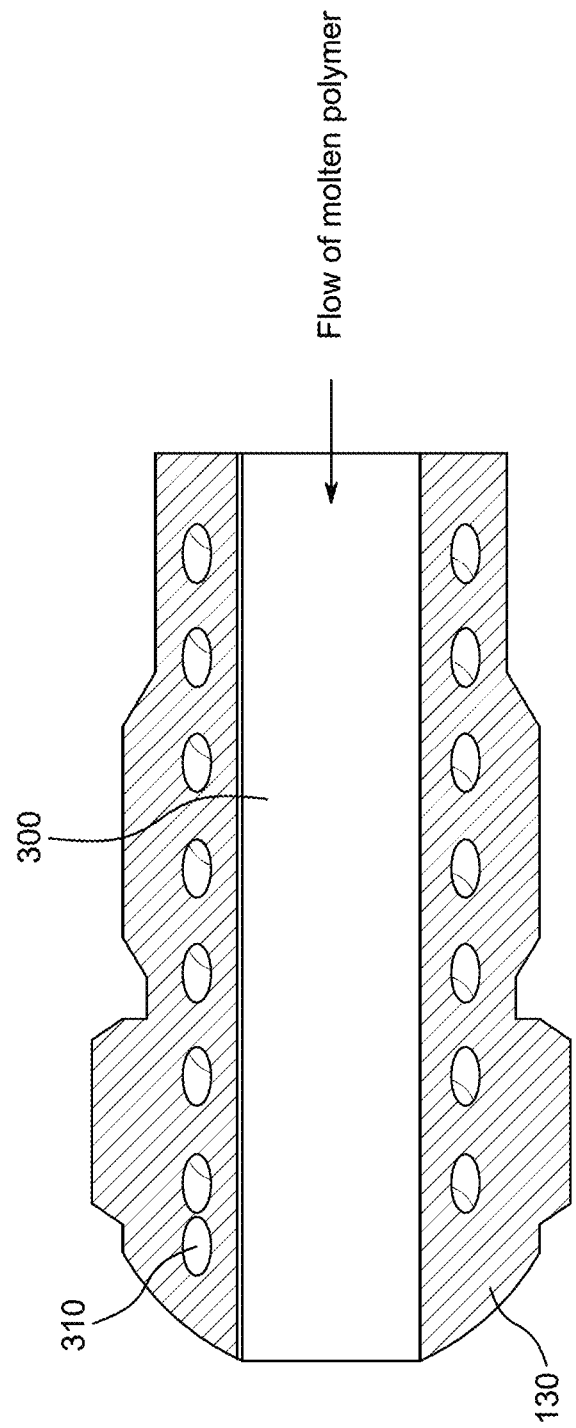
FIG. 19 schematically illustrates a cross-sectional view of the nozzle tip of FIG. 16 with a large central passageway.

FIGS. 16 and 17 illustrate perspective views of the nozzle tip 130. The nozzle tip 130 includes a threaded section 320 on its outer diameter. The threaded section 320 is useful in securing the nozzle tip 130 to the nozzle tip body 120. The nozzle tip 130 further includes a first port 330 and a second port 340 (as illustrated in FIG. 17). The first port 330 can be attached to a fluid source to channel fluid into the cooling mechanism 310, and the second port 340 can be attached to a fluid line to evacuate fluid from the cooling mechanism. With reference to FIGS. 18 and 19, the cooling mechanism 310 of the nozzle tip 130 includes an efficient helix water cooling circuit surrounding the internal passage 300 of the nozzle tip 130. The cooling mechanism 310 includes a continuous double helix. The initial portion of the helix accepts the input of cold water or other fluid via the first port 330 and moves the cold water from the rear of the nozzle tip 130 to the front end of the nozzle tip 130. Once the helix reaches the front end of the nozzle tip 130, the helix reverses course and moves the fluid back toward the rear of the nozzle tip 130 where it exits the nozzle tip 130 through the second port 340.

As cold or cool water or other fluid is introduced into the helix and progresses through the nozzle tip 130, the fluid removes heat from the polymer remaining in the internal passage 300 of the nozzle tip 130. The continuous double helix nature of the cooling mechanism 310 makes two passes through the nozzle tip 130, which removes more heat from the polymer in the internal passage 300 of the nozzle tip 130. Thus, the process results in the rapid cooling and solidification of the residual molten materials, which will be ejected or otherwise removed prior to the subsequent injection cycle. The cooling effects of the cooling mechanism 310 not only cools and solidifies the polymer in the internal passage 300, but the cooling effect also cools and solidifies the polymer that is in the flow path 140 between the actuated pin 200 and the nozzle tip.

To prepare for the next injection cycle, the four heating elements 160 in the nozzle tip 130 are initiated to heat the nozzle tip 130 to prepare for additional polymer to flow through the nozzle tip 130. The internal passage 300 is a large channel that is designed to prevent early and inefficient cell nucleation as the polymer is injected into the cavity of the mold during the injection cycle. The flow path 140 through a significant portion of the shut-off nozzle and the internal passage 300 through the nozzle tip 140 maintain a constant diameter and cross-sectional area along their lengths, which further prevents early and inefficient cell nucleation as the molten polymer prepares to be injected into the mold cavity.

As illustrated in FIG. 17, the rear surface of the nozzle tip 130 includes two concentric grooves 350, 360. A first groove 350 is positioned between the first 330 and second 340 ports and the internal passage 300. The second groove 360 is positioned between the first 330 and second 340 internal ports and the outside surface of the nozzle tip 130. An O-ring or similar gasket can be placed into each groove 350, 360 to prevent leakage of the cooling fluid into the internal passage 300 or outside the nozzle tip 130.

Figure 20A:
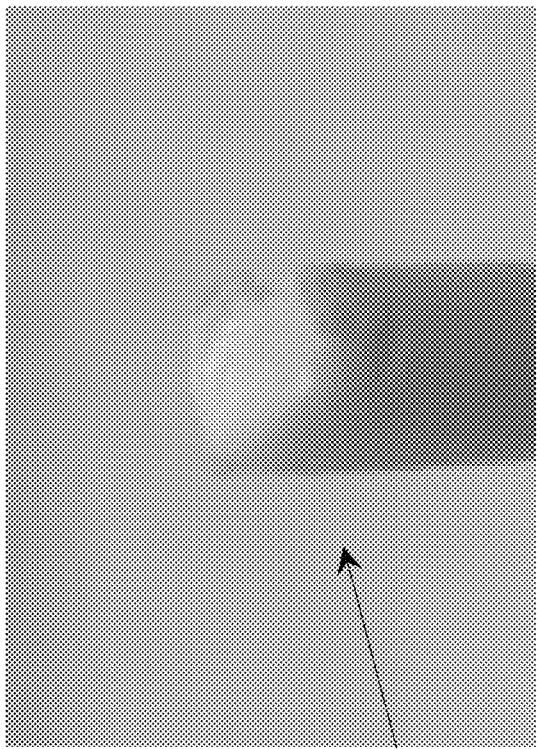
FIG. 20A is an enhanced view of the tip of the sprue of FIG. 20.
Figure 20:
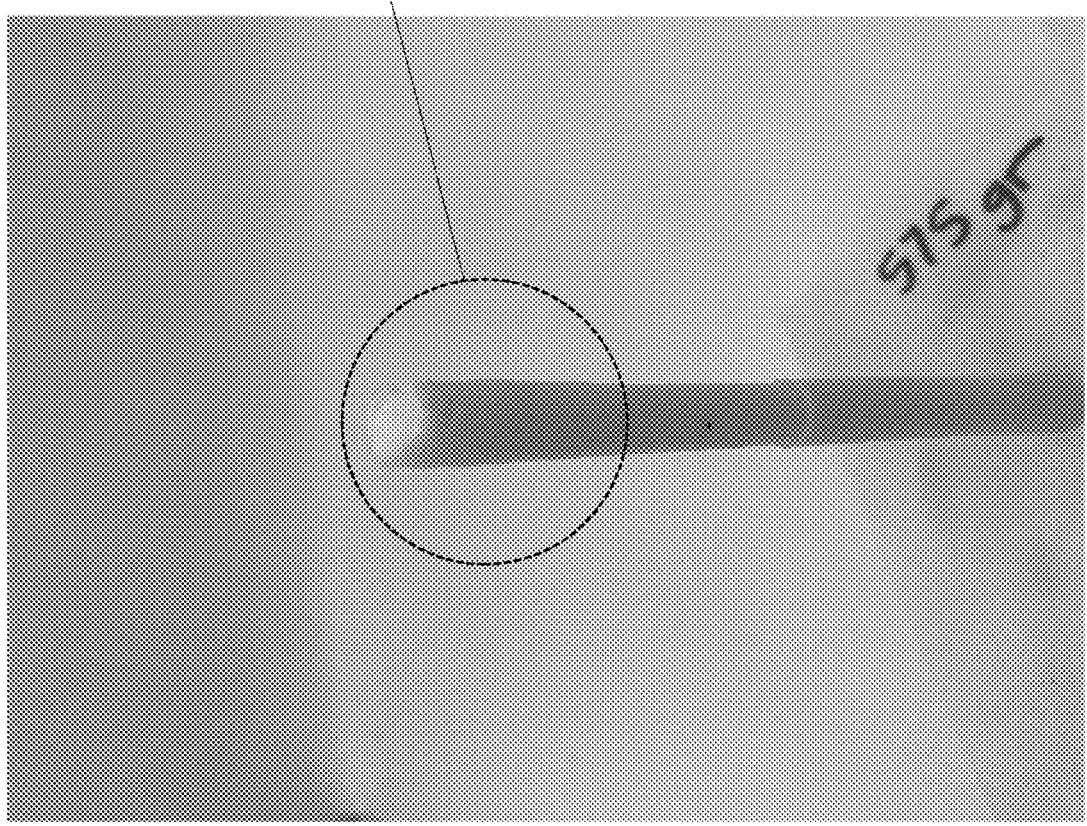
FIG. 20 is a photograph of an article formed by an injection molding machine with the shut-off nozzle as described herein, with the sprue remaining intact with the article.

FIG. 20 is a photographs of an article made using the novel shut-off nozzle with the full sprue remaining intact, and FIG. 20A is an enhanced view of the portion of the sprue that interacted with the pin 200. The sprue represents the solidified polymer that remains in the internal passage 300 of the nozzle tip 130 and the flow path 140 between the actuated pin 200 and the nozzle tip 130 at the end of each injection cycle and cooling period. As is shown in the photographs, there is a clean cut in the polymer material and not a stringy remnant of material that is present when using prior art shut-off nozzles. Thus, the novel shut-off nozzle 100 remediates the irregularities that result from the use of prior art shut-off nozzles.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A method for forming a polymer part comprising the steps:
   providing an injection molding system with a shut-off nozzle comprising:
      a main body;
      a nozzle tip body extending from the main body;
      a flow path through the main body and the nozzle tip body;
      a nozzle tip positioned partially in the nozzle tip body, wherein the nozzle tip comprises:
         an internal passage; and
         a cooling mechanism; and
      a shut-off mechanism comprising:
         a passageway intersecting the flow path at an angle to the flow path; and
         a pin positioned in the passageway;
   initiating an injection molding cycle by injecting molten polymer through the shut-off nozzle into a mold until a cavity of the mold is filled with molten polymer;
   actuating the shut-off mechanism to move the pin in the passageway into the intersection of the passageway and flow path; and
   initiating the cooling mechanism to solidify molten polymer in the nozzle tip to form a solid slug.

2. The method of claim 1, further comprising the step of cooling the molten polymer in the cavity of the mold to solidify the molten polymer in the cavity of the mold to form a polymer part.

3. The method of claim 2, wherein the step of initiating the cooling mechanism to solidify molten polymer in the nozzle tip to form a solid slug and the step of cooling the molten polymer in the cavity of the mold to solidify the molten polymer in the cavity of the mold to form a polymer part occur at the same time.

4. The method of claim 2, wherein after the step of initiating the cooling mechanism to solidify molten polymer in the nozzle tip to form a solid slug and the step of cooling the molten polymer in the cavity of the mold to solidify the molten polymer in the cavity of the mold to form a polymer part are completed, the cold slug and formed polymer part are physically connected.

5. The method of claim 4, further comprising the step of ejecting together the formed polymer part from the mold and the solid slug from the nozzle tip.

6. The method of claim 1, further comprising the step of actuating the shut-off mechanism to retract the pin in the passageway such that it is not located in the intersection of the passageway and the flow path.

7. The method of claim 1, wherein the intersection of the passageway and the flow path is proximate to the nozzle tip.

8. The method of claim 6, wherein when the pin is in located in the intersection of the passageway and flow path no material can flow past the intersection of the passageway and flow path.

9. The method of claim 8, wherein when the pin is retracted such that it is not located in the intersection of the passageway and the flow path, material can flow past the intersection of the passageway and flow path.

10. The method of claim 6, wherein a control unit moves the pin between a position where the pin is located in the intersection of the passageway and flow path and a position where the pin is not located in the in the intersection of the passageway and flow path.

11. The method of claim 1, wherein the flow path between the intersection of the passageway and the flow path and the nozzle tip is generally consistent in diameter.

12. The method of claim 1, wherein the shut-off nozzle further comprises:
   a first temperature sensor; and
   a second temperature sensor.

13. The method of claim 12, wherein the second temperature sensor is positioned in the nozzle tip body to measure the temperature of the nozzle tip body.

14. The method of claim 13, wherein the first temperature sensor is positioned at approximately the mid-point of the nozzle tip body and extends into the flow path to measure the temperature of material passing through the flow path.

15. The method of claim 14, wherein the shut-off nozzle further comprises:
   one or more heating elements are positioned in the main body to heat the flow path; and
   one or more heating elements are positioned in the nozzle tip body to heat the flow path.

16. The method of claim 15 wherein comprising the sets of a control unit:
   monitoring a temperature measured by the first temperature sensor and the temperature measured by the second temperature sensor; and
   adjusting the one or more heating elements positioned in the main body and the one or more heating elements are positioned in the nozzle tip body based on the temperature measurements.

17. The method of claim 1, wherein the internal passage is connected to the flow path and an axis of the internal passage is colinear with an axis of the flow path and a diameter of the internal passage is equal to a diameter of the flow path.

18. The method of claim 1, wherein the cooling mechanism includes a helix circuit arranged to accept the flow of fluid through the helix circuit.

19. The method of claim 18, wherein the helix circuit begins at a first end of the nozzle tip, extends to a second and opposite end of the nozzle tip, and returns to the first end of the nozzle tip.

20. The method of claim 19, wherein as fluid flows through the helix circuit, heat from the internal passage and the nozzle tip are transferred to the fluid.

21. The method of claim 20, wherein when heat is transferred from the internal passage and the nozzle tip to the fluid, any molten polymer in the internal passage solidifies.

* * * * *